United States Patent [19]

Brown et al.

[11] 4,062,247
[45] Dec. 13, 1977

[54] TELESCOPING LINKAGE FOR HELICOPTER SIGHT

[75] Inventors: Ralph Auldon Brown, Bountiful; Kenneth Harold Meinelt, Salt Lake City, both of Utah

[73] Assignee: Sperry Rand Corporation, New York, N.Y.

[21] Appl. No.: 709,576

[22] Filed: July 28, 1976

[51] Int. Cl.² .............................................. F41G 3/00
[52] U.S. Cl. ........................................ 74/89; 33/138; 33/262; 89/41 EA; 242/54 A; 244/83 F
[58] Field of Search ............ 33/1 M, 1 CC, 1 R, 161, 33/138, 235, 281, 262; 89/41 EA, 37.5 A, 37.5 R; 343/877; 52/108; 244/3.14, 3.16, 83 F; 242/54 A; 74/89

[56] References Cited

U.S. PATENT DOCUMENTS

| | | | |
|---|---|---|---|
| 1,387,678 | 8/1921 | Anderson | 89/41 EA |
| 2,130,993 | 9/1938 | Dubilier | 52/108 |
| 2,369,258 | 2/1945 | Shebat | 244/83 F |
| 3,016,988 | 1/1962 | Browning | 52/108 |
| 3,070,886 | 1/1963 | Tassie | 89/41 EA |
| 3,617,015 | 11/1971 | Kinder | 244/3.14 |

FOREIGN PATENT DOCUMENTS

| 140,091 | 8/1934 | Austria | 52/108 |
|---|---|---|---|

*Primary Examiner*—Richard E. Aegerter
*Assistant Examiner*—John W. Shepperd
*Attorney, Agent, or Firm*—John R. Flanagan; Marshall M. Truex

[57] ABSTRACT

A mechanical linkage connected between a pilot's helmet and a reference point in an aircraft permitting freedom of movement of the pilot's head in three dimensions as he visually tracks a target. A set of metal tapes provides freedom of movement in the longitudinal direction while two sets of mechanical linkages provide freedom of movement in the azimuth and elevational directions.

3 Claims, 3 Drawing Figures

TELESCOPING LINKAGE FOR HELICOPTER SIGHT

BACKGROUND OF THE INVENTION

Aircraft, and particularly military aircraft, utilize various types of target tracking systems. Such systems used in conjunction with computers and servo control systems are used to automatically and continuously train the aircraft guns and/or cameras on the target.

One method utilized to provide target tracking data to an aircraft processor employs a linkage connected between the pilot's helmet and a reference point on the aircraft. The linkage has mounted therein a system of motion sensing resolvers which sense the motion of the pilot's head as he visually tracks the target and provides continuous target directional data to the aircraft computer. Such a system frees the pilot for other tasks inasmuch as his visual tracking of the target is all that is required, and this is accomplished by the linkage attached between the pilot's head and an input to the computer located in the airframe.

In such a target tracking system, the linkage must respond to the movement of the pilot's head in the azimuth and elevational directions for resolution by the resolvers to provide appropriate directional information. In addition the linkage must also give freedom of movement of the pilot's head in the longitudinal direction to provide complete freedom of movement of the pilot's head without impeding his freedom of motion.

Such longitudinal movement has been provided in the past by using a collapsing or telescoping tubular arrangement. Such systems are restrictive to movement in both the expanding and collapsing directions. In addition the amount such tubes may be collapsed or expanded is limited by the necessity of stacking with a resultant restriction on the extent of the pilot's movement in the longitudinal direction. Similarly, such arrangements are bulky and require a number of tube sections which must be specially made to provide the telescoping feature.

The present invention provides a linkage system between a pilot's helmet and a reference point on the aircraft which eliminates the above disadvantage and provides a linkage utilizing fewer parts which collapses to a smaller size and extends a greater distance and which uses fewer parts than the tubular arrangements discussed above. In addition the linkage of the present invention provides greater flexibility and resiliency of movement and is not unduely affected by torsional body movement or sudden longitudinal movements of the pilot's head.

The present invention contemplates a linkage providing unrestricted three dimensional movement of the pilot's head. More specifically, the present invention contemplates two or more prestressed metal tapes each having an end effectively connected to a pilot's helmet and its other end connected to a reel to permit the tape to be unwound thereon. In their longitudinally expanded condition, the tapes form a rigid tubular area which houses a wire which makes the electrical connection between direction sensing devices and the computer panel. One set of mechanical linkages is provided to respond to head rotational movement in the azimuth and elevational directions while a compensatory set of mechanical linkages are provided which compensate for pilot's body movement in the left-right or up-down directions.

OBJECTS OF THE INVENTION

It is an object of the present invention to provide a linkage between a pilot's helmet and the airframe which permits three dimensional movement of the pilot's head.

Another object of the present invention is to provide a mechanical linkage between a pilot's helmet and the airframe for carrying the electrical input to a computer in a visual target tracking system.

A further object of the present invention is to provide mechanical linkage means between a pilot's helmet and a reference point in the airframe permitting rotational movement of the pilot's head in the longitudinal, azimuth and elevational directions as the pilot visually tracks a target while compensating for nonrotational movement of the pilot's head caused by body movement.

Other objects and many of the attendant advantages of the present invention will become more apparent upon reading the following description in conjunction with the accompanying drawing.

DESCRIPTION OF THE INVENTION

Figure 1:
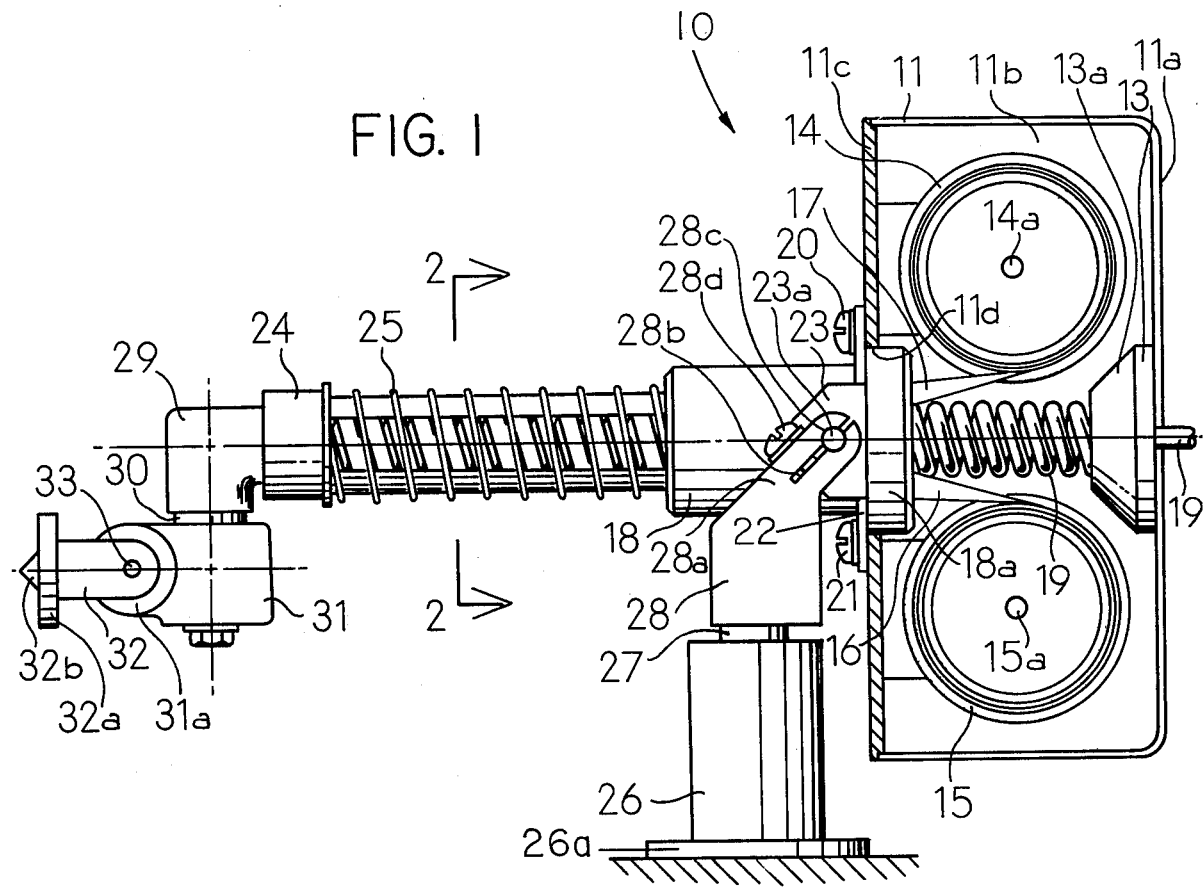
FIG. 1 illustrates a preferred embodiment of the present invention.

Referring now more particularly to FIG. 1, there is shown a preferred embodiment of the linkage system 10 of the present invention. A housing 11 is positioned within the airframe in the vicinity of a computer panel which houses a computer, one of whose functions is to compute target position and direct a weapons system to the target in response to pilot-head movement in the azimuth and elevational directions. The input data to the computer is provided by resolvers associated with the linkage which respond to movement of the pilot's helmet and, therefore, line of sight to the target. Inasmuch as the present invention relates only to the mechanical linkage system, per se, no discussion of the computer and its function is given here. The location of the resolvers and their function will be discussed only insofar as such is necessary to explain their relationship to the linkage system 10.

A deflector 13 is secured to the inside of wall 11a in any convenient manner, e.g., bolts (not shown). The deflector 13 serves two functions. One function is to serve as a holding means for a coiled electrical conductor 19 which extends through it and is flexibly connected to a computer panel in the airframe (not shown). The other function of deflector 13, and more particularly the slanted portion 13a thereof, is to act as a deflector for the prestressed tapes as they wind and unreel from their respective reels to be discussed more fully hereinbelow.

A pair of reels 14 and 15 are mounted on shafts 14a and 15a, respectively, for free rotation thereon. The shafts 14a and 15a have one end mounted in sidewall 11b of housing 11 and their other end in the opposite sidewall which is removed from housing 11 for ease of showing.

It should be noted that three or more reels could be used if desired as will be explained in connection with FIG. 3.

Figure 2:
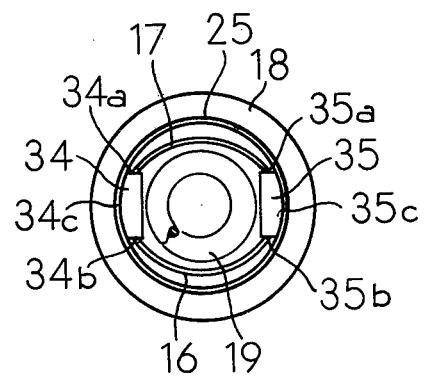
FIG. 2 is a sectional view taken through lines 2—2 of FIG. 1.

Each reel 14 and 15 has wound thereon lengths of metal tape 16 and 17, respectively. The metal tapes are not unlike those used in tape measures but would normally have larger widths. The metal tapes 16 and 17 are curved as can be seen in FIG. 1 and are prestressed in such a way they are curved as shown in FIG. 2. Such prestressing may also bias them to unwind or rewind on the reels 14 and 15 when there is not a counterbalancing force in the opposite direction.

A guide sleeve 18 through which metal tapes 16 and 17 and conductor 19 are guided in a manner to be discussed hereinafter is attached to wall 11c of housing 11 in any convenient manner. For example, a flange 18a integral or otherwise secured to an end of guide sleeve 18 and a circular element 22 surrounding guide sleeve 18 is bolted to wall 11c by means of bolts 20 and 21. The flange 18a is fitted in opening 11d of housing 11.

The flange 18a has an opening (not shown) through which metal tapes 16 and 17 as well as conductor 19 pass. It also has an extension 23. A pin 23a is fixed for rotation within extension 23.

The ends of tapes 16 and 17 which extend through guide sleeve 18 are attached to block 24. A guard spring 25 is connected between guide sleeve 18 and block 24. The tapes 16 and 17 permit longitudinal movement of the block 24 in addition to providing a protective wall about the conductor 19 which is enhanced by the curvature of tapes 16 and 17. Where three tapes are used, this protection is more positive.

The conductor 19 is also physically attached by any convenient means to block 24. The conductor which is similar to a telephone extension is coiled to permit its extension and retraction along with the tapes 16 and 17. The conductor 19 is also electrically connected to the block 24 which serves as a connector between it and the sensing resolvers associated with the left-hand portion of the linkage system 10.

The guard spring 25 also functions in a manner to support and maintain the conductor 19 within the confines defined by the tapes 16 and 17 as the tapes 16 and 17 unwind and rewind on the reels 14 and 15, respectively.

In addition, the guard spring 25 functions as a counterbalance, i.e., it overcomes the natural tendency during prestressing of the tapes 16 and 17 to unwind or rewind by causing the net force of the tapes 16 and 17 to be zero, such that the tapes 16 and 17 respond to any slight movement of the pilot's head in the longitudinal direction.

A support 26 which is fixed at its base 26a to the airframe in a convenient manner, e.g., bolting (not shown) has a shaft 27 extending from its upper end. A swivel element 28 is disposed on the shaft 27 for rotation thereon in the left-right or azimuth direction.

Extension 28a has a slit 28b with a rounded portion 28c for receiving pin 23a which is securely held therein by means of bolt 28d. This arrangement permits movement of the linkage system in the up-down or elevational direction by rotation of the pin 23a within extension 23.

Block 24 has an L-shaped extension 29 either integrally formed therewith or otherwise secured thereto.

A shaft 30 extends into element 31 which is rotatable relative to L-shaped extension 29 on the shaft 30. The element 31 may be rotatably secured to shaft 30 by any means, e.g., a nut 30a on the end of shaft 30 which extends through the bottom of element 31.

Another element 32 has a helmet attachment formed by circular portion 32a and a pointed crown 32b. The crown 32b fits into a similarly shaped opening in a helmet (not shown). The portion 32a is magnetized for securing the linkage system 10 to the helmet. The pointed, circular shape of the crown 32b permits rotation of the pilot's head in the vertical plane without any resultant motion of the linkage system 10.

The element 32 is connected to a circular shaped portion 31a of element 31 by means of a pin 33 which permits up-down or elevational motion of the pilot's head relative to element 31. Shaft 30 permits left-right motion or azimuth motion of the pilot's head relative to element 29. The pin 33 is fixed to element 32 and rotates with element 32 relative to element 31.

While not shown and not part of the present invention, a resolver is associated with pin 33 for providing elevational data; and a resolver is associated with element 31 for providing azimuth data as the pilot moves his head in the elevational and azimuth directions, respectively.

Likewise, a resolver is associated with pin 23a and shaft 27 to provide elevational and azimuth data.

Two sets of resolvers and two freedoms of motion in the elevational and azimuth directions are used for compensation purposes in the event a pilot moves bodily left to right or up and down without rotation of his head on his neck.

As the pilot moves back and forth in the longitudinal direction, the tapes 16 and 17 wind or unwind on the reels 15 and 14, respectively.

The guide sleeve 18 guides and maintains the tapes in their relative positions to each other.

FIG. 2 illustrates the guide sleeve 18 in a view taken through line 2—2.

Referring to FIG. 2, the guide sleeve 18 has a pair of opposing projections 34 and 35 on the inner wall thereof. Projection 34 has sides 34a and 34b and a slot 34c. Projection 35 has sides 35a and 35b and a slot 35c. The edges of metal tape 17 ride on and are guided by sides 34a and 35a while the edges of metal tape 16 ride on and are guided by sides 34b and 35b. Sides 34a, 35a, 34b and 35b serve to maintain the tapes 16 and 17 in position relative to each other as they pass back and forth through the guide sleeve 18 in response to movement of the pilot's head in the longitudinal direction. The guard spring 25 is held in slots 34c and 35c which form its attachment to the guide sleeve 18.

As can be seen, the conductor 19 occupies and is held within the space formed by the metal tapes 16 and 17. The guard spring 25 aids in this restriction of the conductor 19.

Figure 3:
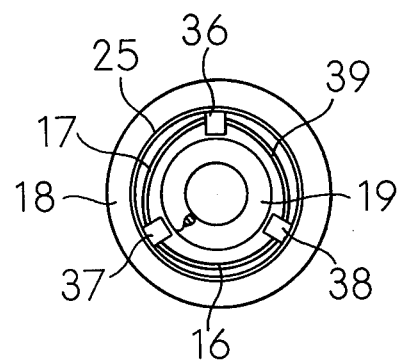
FIG. 3 is a sectional view of another embodiment of FIG. 1 taken through line 2—2 of FIG. 1.

FIG. 3 illustrates guide sleeve 18 which depicts a view taken through line 2—2 for a second embodiment of the linkage system 10 where the linkage system employs three metal tapes.

In this embodiment, the guide sleeve 18 has three projections: 36, 37 and 38 with sides and slots similar to projections 34 and 35. The edges of tapes 16, 17 and 39 ride on and are guided by as well as maintained in relative position by the sides of projections 36, 37 and 38. The embodiment using three metal tapes and the guide sleeve of FIG. 3 offer more rigidity of the linkage and more restriction of the conductor 19 within the space formed by the metal tapes.

The portion 13a of circular deflector 13, as seen in FIG. 1, guides the tapes off and onto the reels 14 and 15; and more particularly, during rewind when the pilot moves his head in the forward direction rapidly, the portion 13a prevents buckling of the tapes.

In operation the linkage system 10 of the present invention permits three-dimensional movement of the pilot's head as he visually tracks a target. The metal tapes 16 and 17 permit him freedom of movement in the longitudinal direction. The element 31 and pin 33 are primarily responsive to head movement in the azimuth and elevational directions. The resolvers associated with these positions provide basic target information.

Pin 23a and shaft 27 are compensating and respond to up-down and left-right movements of the pilot's head as his body moves, i.e., movement of the head without rotation of the head on the neck. The resolvers at these positions compensate for this type of movement so that subsequent or concurrent rotational movement of the pilot's head provides continuously accurate target data.

Other modifications and variations of the present invention are possible in light of the above description which should not be construed as limiting the invention which is set forth in the appended claims.

We claim:

1. A linkage for interconnecting an object, such as a helmet, to a reference location to provide for longitudinal movement of said object toward and away from said reference location, comprising the combination of:
   first means connectable to said object;
   a plurality of metal tapes, one of the ends thereof being connected to said first means in a fixed spatial relationship;
   second means mountable at said reference location and including a housing;
   a plurality of reels;
   means secured to said housing and rotatably mounting said reels;
   said plurality of reels corresponding in number to said plurality of tapes, an opposite end of each of said tapes being connected to a respective one of said reels such that said tapes unwind from said reels when said first means is moved away from said second means and rewind on said reels when said first means is moved toward said second means;
   said second means further including a hollow guide sleeve mounted to said housing and aligned with said reels so as to receive said tapes therethrough, said sleeve including internal spaced apart projections which respectively engage with the side edges of said tapes and maintain said tapes in said fixed spatial relationship as said tapes are moved through said sleeve during unwinding and rewinding thereof; and
   said tapes being prestressed to assume curved cross-sectional configurations when unwound from said respective reels whereby unwound portions of said tapes, in being coextensively maintained in said fixed spatial relationship by said first means and said guide sleeve projections, form a substantially rigid tubular structure extending between said first and second means.

2. The linkage as recited in claim 1, further comprising:
   a tape deflector mounted to said housing and disposed adjacent said reels for guiding said tapes so as to prevent buckling thereof during rewinding of the same on the reels.

3. The linkage as recited in claim 1, wherein unwound portions of said tapes, in forming said substantially rigid tubular structure extending between said first and second means, define a partially enclosed longitudinal space for housing an electrical conductor wire or the like.

* * * * *